Nov. 15, 1966  E. D. HAUK  3,285,778
APPARATUS AND METHOD FOR REMOVING SCALE
AND WAX FROM OILWELL TUBING
Filed Jan. 22, 1963  5 Sheets-Sheet 2
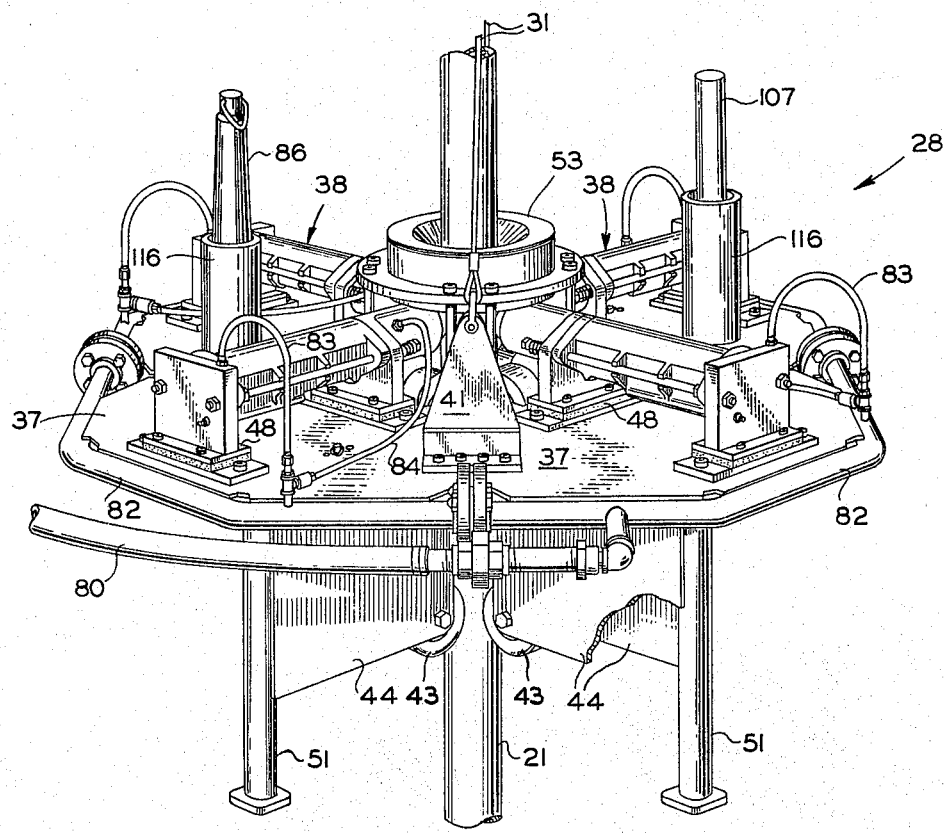
FIG. 3
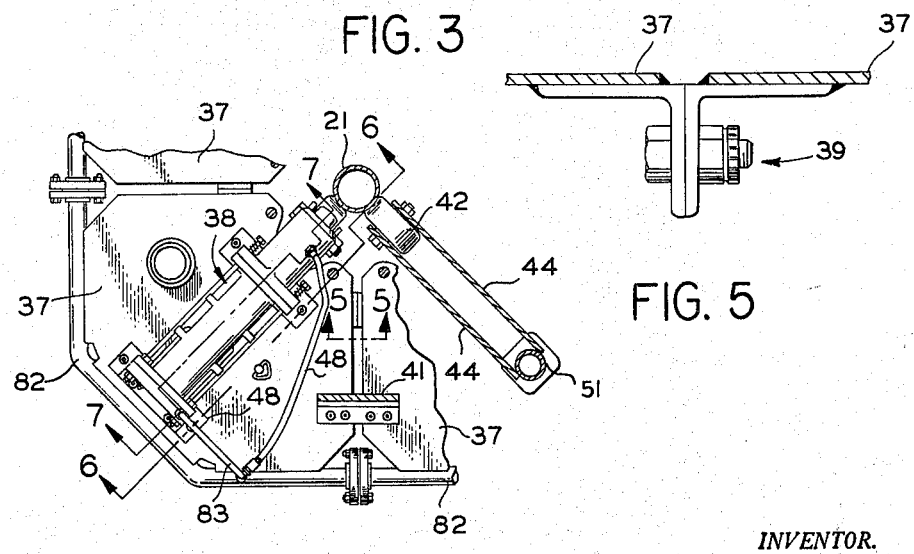
FIG. 4
FIG. 5
INVENTOR.
ERNEST D. HAUK
BY
ATTORNEY

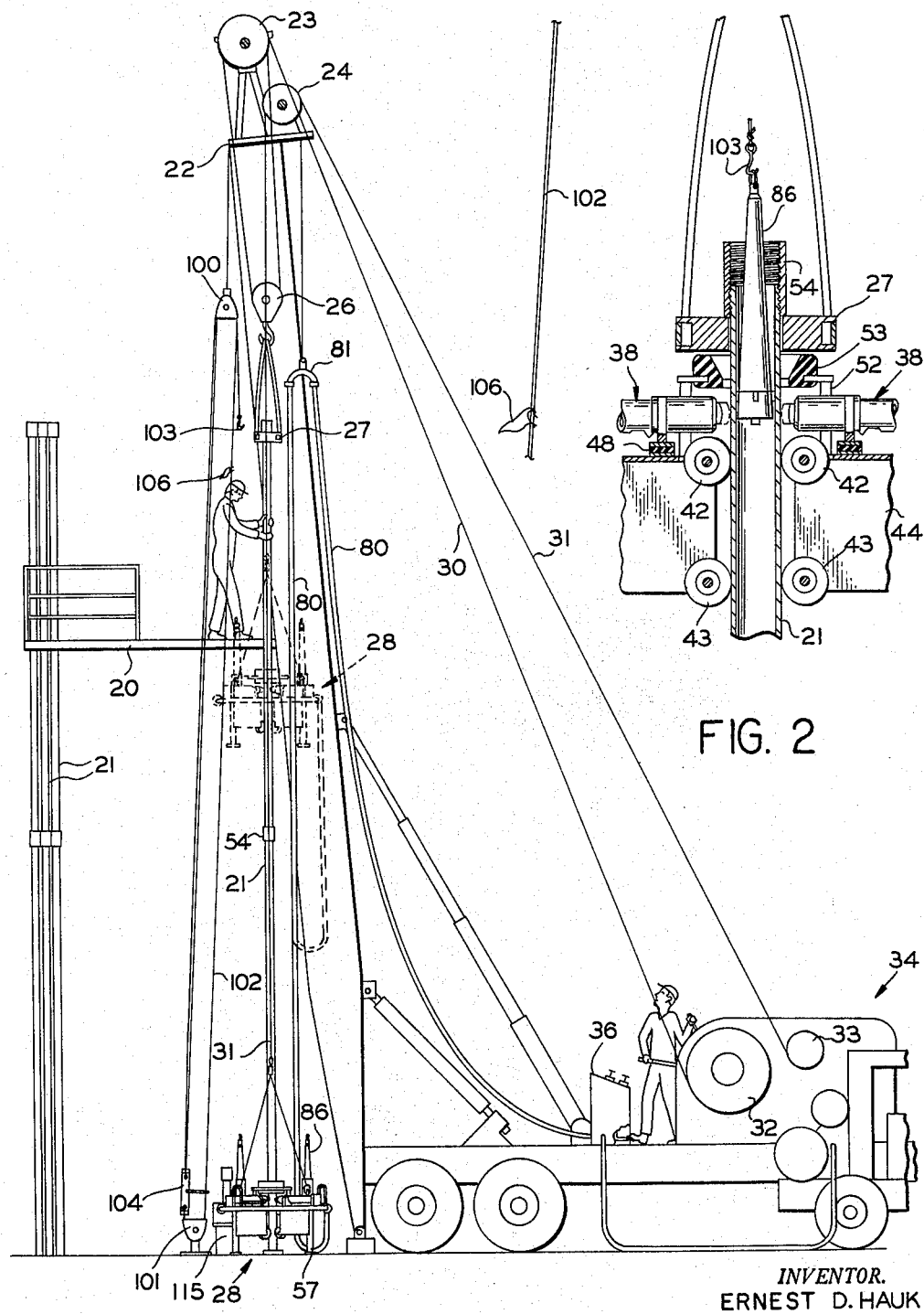

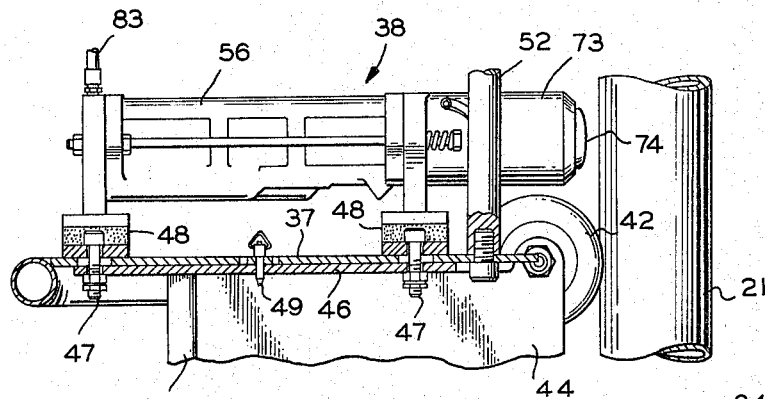
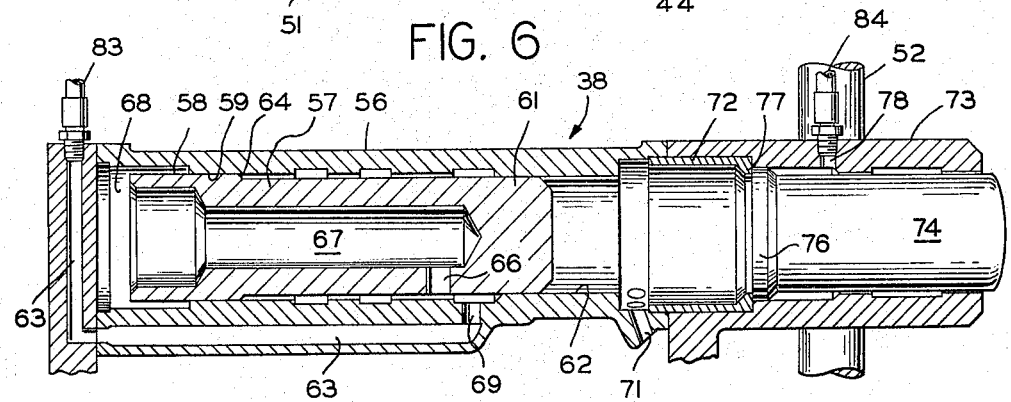
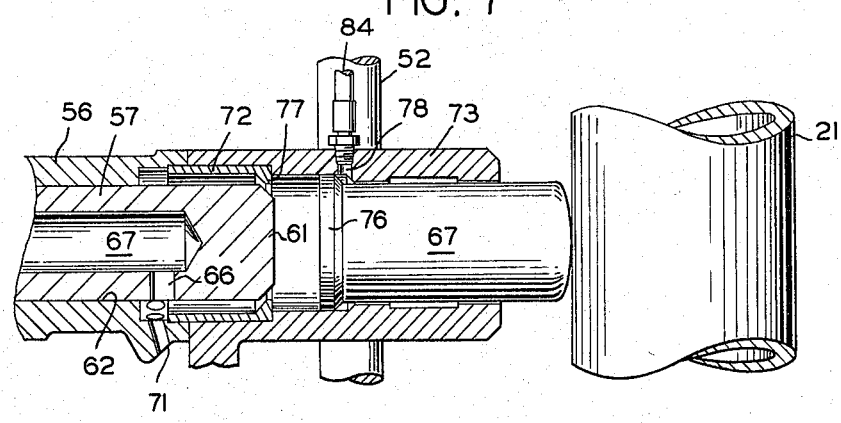

Nov. 15, 1966   E. D. HAUK   3,285,778
APPARATUS AND METHOD FOR REMOVING SCALE
AND WAX FROM OILWELL TUBING
Filed Jan. 22, 1963   5 Sheets-Sheet 4

INVENTOR.
ERNEST D. HAUK
BY
ATTORNEY

Nov. 15, 1966  E. D. HAUK  3,285,778
APPARATUS AND METHOD FOR REMOVING SCALE
AND WAX FROM OILWELL TUBING
Filed Jan. 22, 1963  5 Sheets-Sheet 5
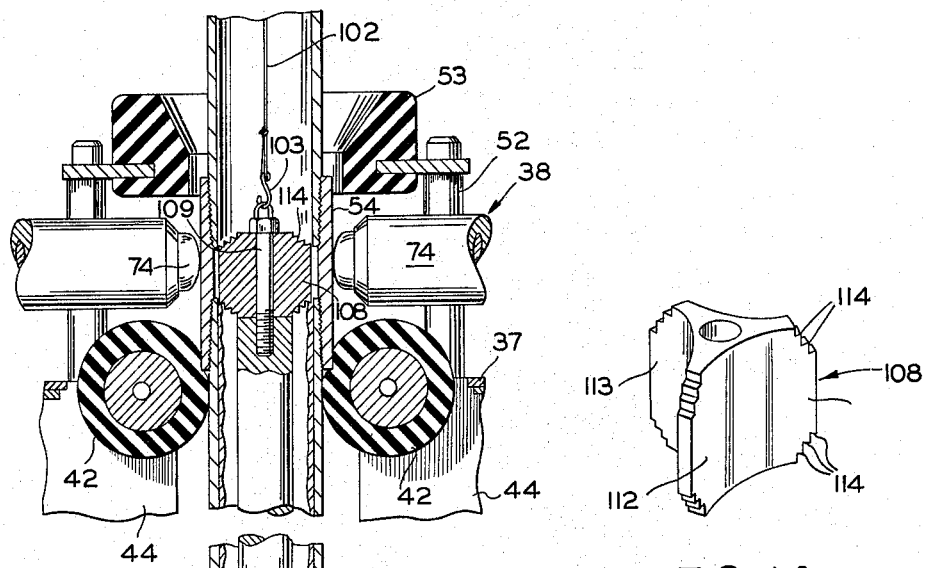
FIG. 14
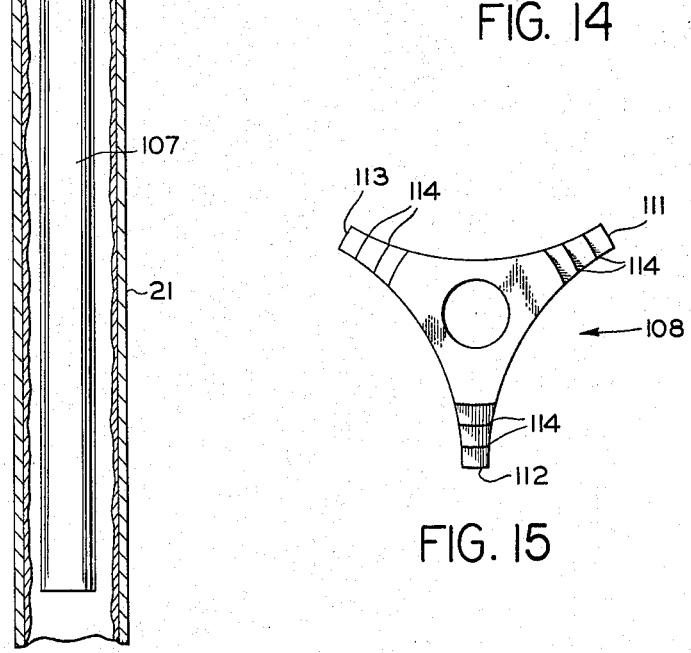
FIG. 15
FIG. 13
INVENTOR.
ERNEST D. HAUK
BY 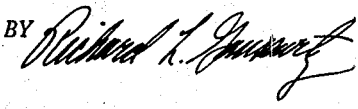
ATTORNEY

United States Patent Office 3,285,778
Patented Nov. 15, 1966

3,285,778
APPARATUS AND METHOD FOR REMOVING SCALE AND WAX FROM OILWELL TUBING
Ernest D. Hauk, 1315 E. 23rd St., Signal Hill, Calif.
Filed Jan. 22, 1963, Ser. No. 254,040
11 Claims. (Cl. 134—8)

This application is a continuation-in-part of my copending patent application Serial No. 91,972, filed February 27, 1961, for an Apparatus and Method for Removing Scale and Wax from Oilwell Tubing, now abandoned.

This invention relates to an apparatus and method for removing scale and wax from stands of oilwell tubing while such stands are disposed vertically and above the ground, adjacent the wellhead of an oilwell.

An object of the invention is to provide a practical, economical, and efficient method and apparatus for rapidly removing scale and most waxes from stands of tubing, without laying down the tubing and without possibility of contamination of the well.

Another object is to provide a method and apparatus for removing scale from both the inside and outside of the tubing, and removing most waxes from the inside of the tubing, without laying down the tubing or breaking the joints thereof.

Another object is to provide a method and apparatus for removing scale from oilwell tubing and simultaneously effecting peening of such tubing to cold work the same.

Another object is to provide a method and apparatus for eliminating scale from the interiors of stands of oilwell tubing in such manner that it is insured that the original drift diameter is present throughout the entire length of the stand.

A further object is to provide a method and apparatus for removing scale from oilwell tubing in such manner that all loose deposits are removed at the surface of the ground and apart from the well hole so that there is no risk of fouling the latter.

Another object is to provide a method of removing scale and also stuck pumps and rods which have been cut off in the tubing, the result being that the original drift diameter is achieved so that the tubing is caused to be like new.

These and other objects will become apparent from the following detailed description taken in connection with the accompanying drawings in which:

FIGURE 1 is an elevational view schematically illustrating the method and apparatus for removing scale and waxes from vertical stands of oilwell tubing;

FIGURE 2 is a fragmentary vertical sectional view illustrating the scale remover apparatus as located adjacent the upper end of a stand;

FIGURE 3 is a perspective view illustrating the apparatus of the invention as suspended around a portion of a stand of tubing;

FIGURE 4 is a fragmentary plan view of the showing of FIGURE 3;

FIGURE 5 is an enlarged fragmentary vertical section taken on line 5—5 of FIGURE 4;

FIGURE 6 is a vertical sectional view taken on line 6—6 of FIGURE 4, adjacent one of the pneumatic hammer devices;

FIGURE 7 is a further enlarged vertical sectional view taken on line 7—7 of FIGURE 4 and illustrating the interior construction of one of the hammer devices;

FIGURE 8 is a fragmentary sectional view corresponding to the right portion of FIGURE 7 but illustrating the internal hammer components in their forwardmost positions, at the instant a blow is delivered to the tubing;

FIGURE 13 is a view corresponding generally to the upper portion of FIGURE 9, but illustrating a different internal cutting apparatus;

FIGURE 14 is a perspective view of the cutter portion of the internal apparatus illustrated in FIGURE 13; and FIGURE 15 is a plan view of the showing of FIGURE 14.

Figures 9, 10, 11, 12:
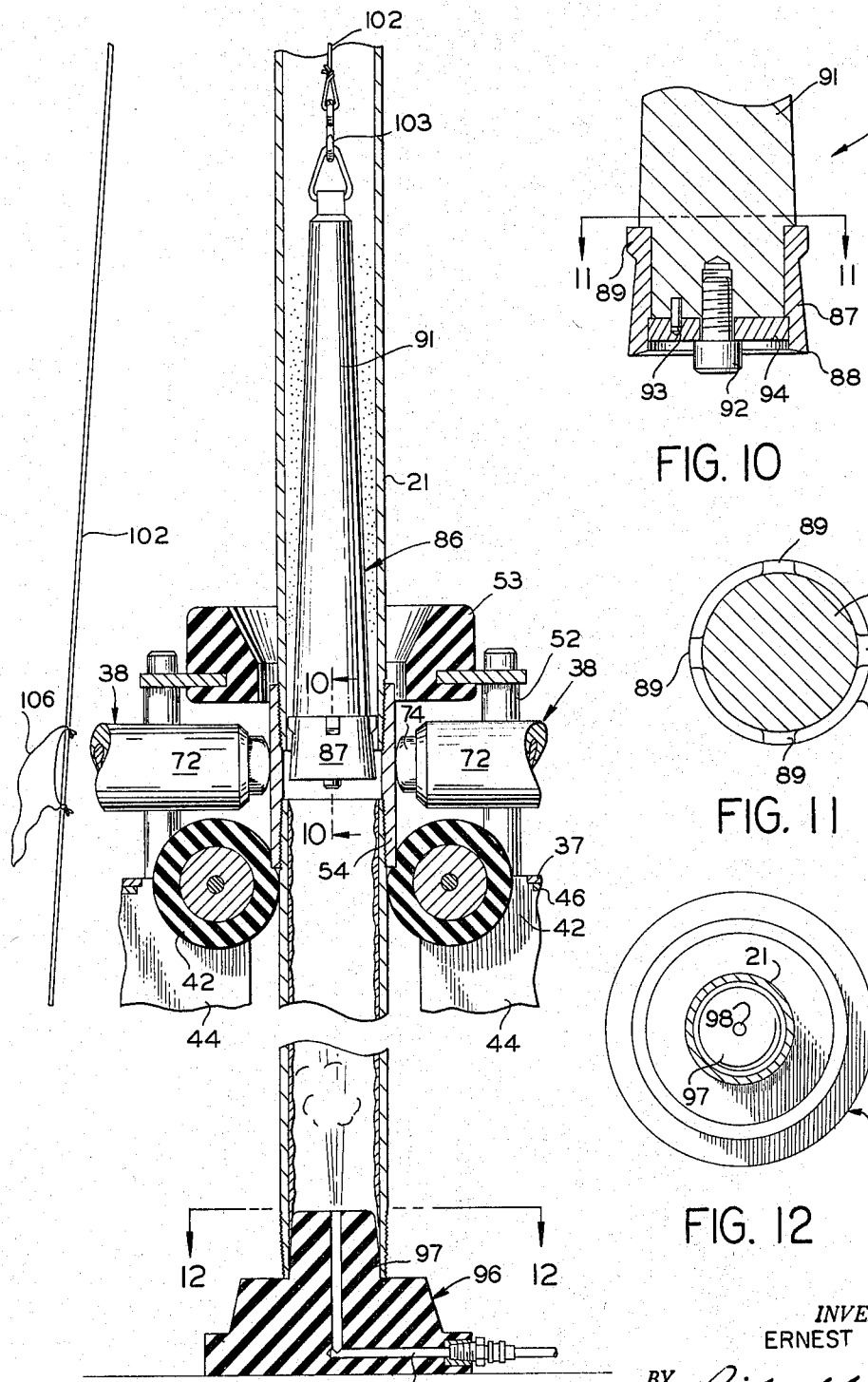
FIGURE 9 is a fragmentary vertical sectional view illustrating the scale remover apparatus on both the exterior and interior of a stand of tubing, and also illustrating the means for delivering an air blast into the lower end of the tubing stand.
FIGURE 10 is a fragmentary vertical section taken on line 10—10 of FIGURE 9 and illustrating the lower end portion of the cutter gauge.
FIGURE 11 is a horizontal sectional view on line 11—11 of FIGURE 10.
FIGURE 12 is a horizontal sectional view taken on line 12—12 of FIGURE 9.

Referring first to FIGURE 1, it is to be understood that a conventional derrick is present although a full showing thereof has been omitted for purposes of simplicity of illustration. The derrick incorporates a platform 20 adapted to support one of the operators, and against which are stacked a number of stands 21 of tubing which has previously been withdrawn from the well and from which it is desired to remove the scale and wax prior to reinsertion into the well. A second and higher platform 22 is schematically indicated and has mounted thereon first and second pulley or sheave devices 23 and 24. The first such device, numbered 23, is associated with the block 26 from which is suspended the elevator 27, the latter being provided with a door or gate (unshown) so that it may be fit over the upper joint of each tubing stand. The second pulley or sheave device, numbered 24, is connected to the exterior components of the scale-remover apparatus of the invention, such exterior components being denoted generally by the reference numeral 28.

The lines 30 and 31 from the respective pulley devices 23 and 24 extend, respectively, to winches 32 and 33 on a truck 34. Truck 34 is supplied with compressed air by a suitable air compressor, not shown, the air being fed to a control console 36 adapted to be controlled by an operator on the truck. Such operator on the truck not only controls the winches 32 and 33 but also the feeding of air to apparatus 28.

*Exterior portion 28 of the scale and wax remover apparatus*

Referring particularly to FIGURES 3–8, inclusive, the exterior portion 28 of the scale remover apparatus is illustrated to comprise a plurality (illustrated as four) of substantially identical horizontal corner plates 37, each corner plate having mounted on the upper surface thereof a pneumatic hammer device 38. The devices 38 extend radially inwardly for high-frequency high-power hammering of the tubing 21, and are of a special construction to be described subsequently. It is to be understood that the corner plates 37 are removably secured to each other by means of suitable joints 39 (FIGURE 5) and also by lugs 41 to which portions of the line 31 are attached in order to suspend the apparatus 28.

The assembled corner plates 37 are open in the center and are provided with means for orienting the apparatus 28, including the pneumatic hammer devices 38, around the tubing 21 so that all of the hammer devices will act equally thereon. Such means include upper and lower idler rollers 42 and 43 (FIGURE 2) disposed in vertically spaced relationship below each of the hammer devices 38.

The rollers 42 and 43 for each hammer are journaled or horizontal axles or shafts associated with pairs of vertically arranged parallel plates 44, which pairs are disposed beneath the respective corner plates 37. As indicated in FIGURE 6, the vertical plates 44 for each hammer have a horizontal plate element 46 rigidly secured to the upper edges thereof and in bearing relationship with the underside of the corner plate 37.

Vertical bolts 47 (FIGURE 6) extend through the plate elements 46 and through slots in the corner plates 37 to base or foot portions 48 of the hammer devices 38. With the described construction, the vertical plates 44 (and associated rollers 42 and 43), and also the hammer devices 38, may be moved radially of the tubing 21 in order to adjust the apparatus for operation upon different diameters of tubing. Suitable means 49 (FIGURE 6) are provided to lock the elements in any desired adjusted position.

Rigidly secured at the outer edges of each pair of vertical plates 44 is a leg 51 adapted to support the entire exterior apparatus 28 on a suitable supporting surface. Other legs 52 extend upwardly from the corner plates 37, relatively adjacent the tubing 21, to support a guide 53 (FIGURE 9) which is adapted to facilitate introduction of the lower end of a tubing stand 21 into the apparatus 28.

The guide 53, the peripheral portions of the idler rollers 42 and 43, and the mounts (incorporated in bases 48) for all of the pneumatic hammer devices 38 are formed of elastomeric material in order to provide vibration isolation and other desired effects. Since the peripheries of the rollers are formed of rubber, it follows that the joint portions 54 of the tubing stands 21 may pass therethrough as indicated in FIGURES 9 and 13.

It is a feature of the invention that the tubing stand serves as a track or guide for the exterior apparatus 28 of the invention. The apparatus moves along such track in a predetermined desired position, due to operation of the follower rollers 42 and 43.

*Description of the pneumatic hammer devices 38*

Each of the pneumatic hammer devices 38 comprises an elongated casing 56 in which is reciprocably mounted a piston hammer 57. The rear or outer end 58 of piston hammer 57 has a relatively large diameter and is adapted to slide in a bore 59 of corresponding diameter. The front or inner end 61 of the piston hammer has a smaller diameter than that of end 58, being adapted to slide in a bore 62 of corresponding diameter.

Passage or conduit means 63 are provided to introduce air into the bore 59 so that such air acts on the external shoulder 64 adjacent outer end 58 of the piston hammer. However, such air also flows through a port 66 and passage 67 in the piston to a chamber 68 at the outer end of casing 56. Since the surface area of the piston portion which is exposed to chamber 68 is much greater than that of the shoulder 64, it follows that the piston is caused to be moved forwardly while the port 66 is in communication with the inlet port portion 69 of the passage or conduit means 63.

As soon as the piston hammer moves forwardly until port 66 is blocked or closed by the wall of bore 62, further introduction of air into chamber 68 is prevented. A short time thereafter, the air exhausts from chamber 68 through port 66 and an exhaust port 71 to the ambient atmosphere. The pressure on shoulder 64 then becomes operative to return the piston to its outer position. In the described manner, the piston hammer is caused to reciprocate very rapidly, at a frequency on the order of 800–1000 cycles (blows) per minute.

A bushing 72 is mounted at the forward end of casing 56 and extends into a housing 73 for a tappet 74, such housing being suitably connected to casing 56. Tappet 74 has a rear flange portion 76 adapted to seat on a radially-inwardly extending flange 77 at the forward end of bushing 72. When the flange portion 76 is thus seated on flange 77, the tappet 74 is in position to receive a blow from the forward end of piston hammer 57, which blow causes the tappet to move forwardly and impinge against tubing 21 as shown in FIGURE 8.

It is a feature of the invention that air is introduced through a port 78 to the forward or inner end of the chamber in which the flange portion 76 of the tappet reciprocates. Such air operates against flange 76 to bias it against flange 77 of the bushing. This insures that the tappet will be in position to receive a blow from piston hammer 57, and that the tappet and piston hammer will not move in an out-of-phase manner so that their actions cancel each other. The forward surface of flange 77 may be termed a critical plane which is so located that the tappet 74 receives a maximum amount of energy from the piston hammer when the flange portion 76 is disposed at such critical plane.

The introduction of air through port 78 serves additional important functions next to the enumerated. In the first place, the tappet 74 of each device 38 is maintained in its retracted position (FIGURE 7) while hammer 57 is idle, to permit tubing to be introduced into the apparatus 28 without being blocked by the inner ends of the tappets. Furthermore, since the clearance around the tappet (between the external cylindrical surface of the tappet and the inner surfaces of the housing 73) is considerable, a continuous flow of air is effected forwardly from port 78 along the surface of the tappet. This effects constant cleaning of the tappet and prevents ingress of scale and other foreign material from the tubing and the ambient atmosphere.

Not only does each pneumatic hammer device 38 operate very rapidly, but it also operates with a large amount of power. This is necessary because the tubing should be struck a very hard blow, although not so hard as to damage the same. Each tappet may weigh, for example, approximately 4½ pounds, being actuated by a piston weighing (for example) about 5½ pounds. The optimum rate of travel of the tappet at the instant of striking the tubing will vary with the size and type of tubing, but should approach (as indicated above) the limit which the tubing can absorb without being damaged. The hammers should be moved constantly, longitudinally of the pipe, since this reduces the likelihood of damage thereto.

The air supply to the apparatus 28 and thus to each of the hammer devices 38 extends from control console 36 (FIGURE 1) through a flexible hose 80 having a center portion 81 which is suitably supported from the platform 22. From portion 81, the hose 80 extends downwardly to an annular manifold 82 which is illustrated in FIGURE 3 as being formed in four connected sections respectively secured to the four corner plates 37. A conduit 83 connects each section of the manifold 82 to an associated passage or conduit means 63 (FIGURE 7). A second conduit 84 connects each conduit 83 to the tappet port 78, it being understood that flow of air to such port 78 may be suitably reduced (by appropriate valves) in comparison to the flow of air to the passage or conduit means 63.

It is also to be understood that the control console 36 (FIGURE 1) is provided with a suitable bypass (not shown) which effects flow of air through line 80 to the devices 38 at all times while the apparatus is being utilized. Such flow of air is insufficiently great to effect reciprocation of piston hammers 57, but is sufficiently great to maintain the tappets 74 in their seated positions (FIGURE 7) so that the tubing 21 may be stabbed through the apparatus 28. The air flow also maintains the tappet housings 73 clean, as previously stated.

*Description of portions of the apparatus which are largely inside the tubing 21*

Referring to FIGURE 9, a highly important element of the present apparatus is a cutter gauge 86 adapted to be actuated (as by gravity) through the tubing stand 21 while the external apparatus including hammer means 38 is moved along the tubing in the vicinity of the cutter gauge. The cutter gauge illustrated in FIGURES 9–11 comprises a frustoconical cutter head 87 having a lower circular cutting rim 88 the diameter of which should be substantially equal to the drift diameter of the tubing. Formed at the upper portions of the cutter head 87 are a plurarality of circumferentially spaced lugs or guides 89 which extend outwardly to an imaginary cylinder coaxial with the cutter gauge and having the same diameter as that of rim 88. The guides 89 aid in maintaining the cutter gauge vertical, and in traversing the joints as illustrated in FIGURE 9.

The cutter head 87 is mounted at the lower end of an elongated tapered weight 91 by means of a screw 92 and dowel 93, the screw and dowel being associated with a plate 94 which seats against a shoulder in the lower end of the head 87.

The tapered element 91 is upwardly convergent, and has a weight adapted to provide sufficient reaction against the scale to cut the same efficiently when the pipe is hammered. Element 91 may weigh on the order of twenty pounds, and should be composed of a dense or high-mass material such as steel.

The weight 91 is tapered in order to minimize the possibility of binding in the tubing due to a wedging action caused by particles of removed scale. An additional means to prevent such binding of the cutter gauge in the tubing may be provided, comprising an air blast element indicated at 96 in FIGURE 9. Element 96 consists of a tapered support 97 shaped to fit into the lower end of the tubing 21 and substantially seal the same. An air passage 98 is formed through support 97 to deliver a continuous air blast to the interior of the tubing during operation of the hammer devices 38. Such air blast maintains the removed scale in suspension, at least in the critical areas upwardly adjacent cutting rim 88.

Referring again to FIGURE 1, means are associated with the cutter gauge 86 to indicate the exact position thereof in the tubing stand 21. Such means comprises two pulley blocks 100 and 101 respectively secured to the platform 22 and to a suitable support adjacent the wellhead. A line 102 is extended upwardly from a hook 103 over the upper pulley block 100, thence downwardly through an opening in a separator element 104, thence upwardly and back over the upper block 100, and thence downwardly through the lower pulley block 101 for attachment to the separator element 104. An indicator flag 106 is tied adjacent hook 103 to the portion of line 102 which extends downwardly around the lower block to the element 104. The result is that the indicator flag moves in the same direcion as hook 103, and through the same distance. It follows that when the hook is connected to the cutter gauge 86, as illustrated in the drawings, flag 106 will at all times indicate the elevation thereof.

*Interior cutter apparatus of FIGURES 13–15*

The interior cutter apparatus illustrated in FIGURES 13–15 is adapted to be associated with the line 102 and thus with flag 106, as previously described, but operates in accordance with a different principle than the principle of operation of the cutter apparatus of FIGURES 9–11.

Thus, while the apparatus in FIGURES 9–11 operates against the scale throughout a substantially 360° angle, that is to say substantially the full circumference of cutter edge 88, the apparatus of FIGURES 13–15 operates through only very limited portions of the circumference of the circle. Instead of cutting the entire face of the scale, the cutter apparatus of FIGURES 13–15 forms vertical channels therethrough to destroy the structural integrity of the scale and permit the hammer devices 38 to dislodge relatively large sections or segments of scale. The action is thus extremely rapid, and very tough and thick scale formations may be successfully removed. Because the cutting portions of the apparatus of FIGURES 13–15 occupy only small portions of the full circle, the weight of the cutter is relatively large per unit area of the scale engaged by the cutter teeth.

The internal apparatus of FIGURES 13–15 comprises an elongated cylindrical weight 107 which operates also as a pilot and which depends below the cutter apparatus indicated at 108. Weight 107 is secured to cutter apparatus 108 by means of a screw 109 with which the hook 103 is adapted to be associated.

The cutter apparatus is generally triangular in horizontal shape, having three cutting portions 111–113 in equally spaced relationship about the circle. The cutting portions 111–113 may each occupy about 20° of the circle, and each is formed with upper and lower toothed or stepped portions 114 which provide the cutting action. It is a feature of the cutter apparatus that, upon removal of the screw 109, the cutter apparatus may be inverted to present fresh cutter teeth to the scale.

*Method of the invention*

In one of its aspects, the method comprises effecting high-frequency high-power hammering of the exterior of a stand of oilwell tubing while such stand is in vertical relationship at the wellhead (indicated at 115 in FIGURE 1) of an oilwell, by moving a hammer apparatus longitudinally of the tubing from one end thereof to the other. In another of its aspects, the method comprises providing a cutter element internally of a stand of tubing and effecting high-frequency hammering of the exterior of the tubing adjacent the cutter element to thus create a vibrating and consequent cutting action whereby the scale is effectively removed from the interior as well as the exterior of the tubing. In an additional and important aspect, the method comprises providing an element internally of the tubing to cut channels through the scale in response to hammering on the exterior of the tubing in the vicinity of such element, so that the cutting action destroys the structural integrity of the scale and the hammering action removes the scale.

With specific reference to the drawings, the exterior portion 28 of the apparatus is supported by its legs 51 adjacent the wellhead 115 of the oilwell, and the cutters 86 and 107–108 are respectively supported in suitable supports 116 (FIGURE 3) on two of the corner plates 37. The illustrated operators, and normally an additional unshown operator located adjacent the apparatus 28 at the wellhead, then manipulate the block 26 and thus elevator 27 to select one of the tubing stands 21 from platform 20 and stab it downwardly through the guide 53 into apparatus 28. The lower end (threaded) of the tubing stand is disposed immediately below the tappets 74 of hammer devices 38, it being important that the hammers do not strike the threads.

The operator on truck 34 then manipulates the control console 36 to apply full air pressure to the apparatus 28, so that the hammers 38 operate rapidly and with much power to hammer against the exterior surface of the tubing 21. The four hammers may combine to strike the tubing three to four thousand blows per minute, although somewhat different frequencies may be employed with consequent changes in the speed of the operation. The operator also manipulates the winch 33 to effect progressive lifting of the apparatus 28 up the tubing stand until it is a substantial distance above the lower end of the stand.

Control console 36 is then operated to effect cessation of the hammering operation, and the winches 32 and 33 are operated to effect lowering of both the stand 21 and the apparatus 28 until the lower end of the stand seats over the air blast apparatus 96 shown in FIGURE 9. However, no air blast is delivered at this time since the cutter apparatus is not disposed in the tubing.

Since the tubing stand is now supported on the air blast apparatus 96, the operator on support 20 may disengage the elevator 27 from the upper end of the stand. The operator on truck 34 then effects commencement of hammering operation, and also effects additional progressive raising of the apparatus 28 until the tappets 74 are centered on the uppermost collar or joint portion 54, at the extreme end of the stand. The truck operator then causes cessation of hammering operation.

The operator on platform 20 removes from its support 116 a desired one of the internal cutter implements, either 86 or 107–108, and disposes it in the upper end of the tubing after connecting the cutter to the hook 103 on line 102. The operator on truck 34 then starts the apparatus 28 and moves it downwardly along substantially the full length of the tubing, in such manner that it is at all times adjacent the flag 106 which, in turn, indicates the elevation of the cutter. During this operation, the air-blast apparatus (shown at the lower end of FIGURE 9) is operated to direct an air blast upwardly into the tubing, thereby maintaining loose scale in suspension at least in the critical area adjacent the cutter.

The elevator 27 is then re-engaged with the upper end of the tubing stand, and the block is manipulated to lift the stand and permit hammering of its extreme lower end, until the cutter element drops to the ground. The cutter element is then removed from the hook 103 and disposed in its support 116 on apparatus 28. The line 102 is manipulated to raise the hook 103 to the position shown in FIGURE 1, the block 26 and elevator 27 are employed to lower the clean tubing into the wellhole, and conventional tongs are employed to associate the clean stand with the stand previously inserted into the well.

Another stand of tubing 21 is then shifted from support 20 to position for cleaning in accordance with the above-described method, after which this clean section is inserted into the well and the process is again repeated with another stand.

*Additional description of various factors important to the Method*

As previously indicated, the maximum or cutting diameter of each of the elements 86 (FIGURE 10) and 108 (FIGURE 14) should be substantially equal to the drift diameter of the tubing. Such drift diameter is smaller than the actual inner diameter, and is specified by the American Petroleum Institute for each size of tubing. Thus, for example, for tubing having a nominal diameter of two and one-half inches, the drift diameter is approximately 0.090 inch smaller than the actual inner diameter of the tubing.

It is essential that the maximum cutter diameter be substantially smaller than the actual inner diameter of the tubing, since it is the relative movement of the cutter and tubing in the radial direction—not the direction longitudinally of the tubing—which effects the primary cutting action. Stated otherwise, the cutter must be sufficiently small to vibrate in the tubing, through a substantial travel, in order to achieve the optimum cutting action and in order to prevent jamming. This is not to imply that the sole movement is by the cutter, it being possible that the tubing wall flexes somewhat with each hammer blow.

The maximum diameter of each cutter may be somewhat smaller than the drift diameter of the tubing, if such cutter diameter is sufficiently large to provide efficient cutting, and to produce the required inner tubing diameter upon completion of the descaling operation. Thus, for example, the difference between the maximum cutter diameter and the actual inner diameter of the tubing may be on the order of 0.120 inch, or somewhat larger, instead of the 0.090 inch indicated above for 2½ inch tubing.

It is emphasized that the weight of the cutter elements 86 and 108 is not of substantial importance relative to the forces exerted longitudinally of the tubing. Instead, the weight is important relative to the vibratory and reaction forces which are created at the actual region of cutting, which forces are generally radial to the tubing. For this reason, the density or mass of the cutter should be high adjacent the cutting area. To illustrate, a long wooden pole weighing 20 pounds and having a cutter at one end would not be nearly so effective as a short iron element of the same weight.

Because the radial (not longitudinal) forces are of paramount importance to the present method, it is essential that elements 86 and 108 be kept free, in condition to vibrate, at all times. Thus, if the operator performing the present method notes that the cutter is ceasing to vibrate, he pulls on the line 102 in such manner as to lift the cutter slightly so that vibration will again commence. The presence or absence of vibrations readily determined by listening to the sound which is generated by the hammers and cutter.

It is important, particularly when the scale formation is of a type difficult to dislodge, that the external hammers be maintained radially adjacent the tubing region where the cutter is located. This results in the most effective and efficient removal of scale and wax from the tubing.

If desired, the cutter gauge 86 may be utilized after the cutter gauge 107–108 shown in FIGURES 13–15, to insure that the original drift diameter of the tubing has been achieved.

Although the cutters of FIGURES 9–11 and 13–15 have been described primarily in reference to scale removal, they are also highly important in wax removal (even if there is no scale). A combination of external hammering and internal cutting is effected for wax removal, as emphasized herein relative to scale removal.

The apparatus of FIGURES 13–15 may be used sequentially, through scale and/or wax. Thus, a three element cutter (as illustrated) may first be used, then a four element cutter (with equally spaced elements like 111–113), then a five element cutter, then the device of FIGURES 9–11.

It is within the scope of the invention to hammer internally on the apparatus of FIGURES 9–11 or 13–15 while external hammering is effected by apparatus 28. Thus, a hammer may be built into the apparatus of FIGURES 9–11 or 13–15.

It is to be understood that use of the apparatus 96 (FIGURE 9) is not essential to the invention.

The tappets 74 are formed with rounded inner ends, or with angled (cam) inner ends, to facilitate movement past joints 54 during hammering operation.

The blow delivered by each of the hammer means should be at least equivalent to that delivered by a two and one-half pound hammer traveling fifty feet per second.

The foregoing detailed description is to be clearly understood as given by way of illustration and example only, the spirit and scope of this invention being limited solely by the appended claims.

I claim:

1. Apparatus for removing scale and wax from the interior of a pipe, which comprises a scale-cutting means disposed interiorly of said pipe at a predetermined point therealong, the length of said scale-cutting means being only a small fraction of the length of said pipe, automatic hammer means disposed exteriorly of said pipe in the general vicinity of said scale-cutting means for imparting high-frequency high-power hammer blows to the exterior of said pipe in said vicinity, and means to effect conjoint progressive movement of said scale-cutting means and said hammer means along the length of said pipe.

2. The invention as claimed in claim 1 in which said hammer means comprises means to deliver at least on the order of one thousand blows per minute at an impact equivalent to that delivered by a two and one-half pound hammer traveling at least on the order of fifty feet per second.

3. Apparatus as claimed in claim 1 in which said scale cutting means has spaced apart cutting portions for forming channels longitudinally of said pipe through the scale therein to thereby destroy the structural integrity of the scale, and enable the rapid hammering of the automatic hammer means to dislodge the scale thus channeled.

4. Apparatus for removing scale and wax from oil-well tubing, which comprises means to support a stand of tubing in generally vertical relationship, cutter and weight means disposed interiorly of said tubing at a predetermined point therealong, the length of said cutter and weight means being less than the length of said tubing, said cutter and weight means being responsive to vibration of said tubing to effect cutting of scale and wax from the interior of said tubing and to drop gravitationally through said tubing at a speed determined by the rate of scale removal therein, means to effect high-frequency high-power hammering of the exterior surface of said tubing at said predetermined point, and means to effect longitudinal movement of said hammering means and tubing relative to each other to maintain said hammering means in the general vicinity of said cutter and weight means.

5. The invention as claimed in claim 4, in which means are provided to direct an air blast into said tubing to effect agitation of the removed scale therein and prevent wedging of said cutter and weight means in said tubing.

6. The invention as claimed in claim 4, in which said cutter and weight means has spaced apart cutting portions for forming relatively narrow longitudinal channels in the scale in said tubing at spaced points about the circumference of said tubing, thereby destroying the structural integrity of said scale so that the same is readily removed by said hammering means.

7. Apparatus for removing scale and wax from the interior and exterior of a stand of oil well tubing while said stand is vertically disposed adjacent the wellhead of an oilwell, which comprises frame means, means associated with said frame means to support a plurality of pneumatic hammering devices at various radial positions around said tubing, tubing-follower means mounted on said frame means for engagement with said tubing to maintain said frame means and hammering devices properly oriented for hammering of said tubing as said frame means is shifted along said tubing, means provided to effect retraction of the inner hammer portions of said hammering devices during intervals between hammering operation, and means provided on said frame means to guide one end of a tubing stand between said retracted inner hammer portions.

8. The invention as claimed in claim 7, in which a relatively heavy cutter means is disposed in said tubing and adapted to effect cutting of scale and wax in said tubing in response to vibration of said tubing effected by said hammering devices, in which means are provided to indicate the longitudinal position of said cutter means in said tubing, and in which means are provided to effect movement of said frame along said tubing to thereby enable the operator to maintain said frame in the vicinity of said cutter means.

9. The invention as claimed in claim 8, in which said indicator means include a line connected to said cutter means and extending into said tubing, pulley means associated with said line, and an indicator element mounted on said line and movable with said line exteriorly of said tubing to indicate the position of said cutter means.

10. A method of removing scale and wax from a stand of oilwell tubing and also effecting peening of said stand, which comprises effecting movement of a scale and wax cutter exteriorly of said tubing, and simultaneously effecting high-frequency hammering of the exterior of said tubing in the general vicinity of said cutter whereby to effect relative vibration of said cutter and tubing to cause said cutter to cut scale and wax from said tubing.

11. A method of removing scale and wax from a stand of oilwell tubing, which comprises disposing a tubing stand in vertical relationship adjacent the wellhead of an oilwell, effecting high-frequency high-power hammering of said stand progressively from the lower end portion of said stand along substantially the full length of said stand to the upper end portion thereof, thereafter introducing a cutter apparatus into the upper end of said stand, and effecting progressive hammering of said stand from the upper end portion thereof to the lower end portion thereof at a speed longitudinally of said stand corresponding to the rate of descent of said cutter apparatus in said stand.

References Cited by the Examiner

UNITED STATES PATENTS

| | | | |
|---|---|---|---|
| 283,205 | 8/1883 | Clark | 15—104.07 |
| 1,263,836 | 4/1918 | Ball | 15—104.04 X |
| 1,617,068 | 2/1927 | McGonagle | 15—104.07 X |
| 2,163,384 | 6/1939 | Stevens | 15—104.07 |
| 2,365,984 | 12/1944 | Warren | 15—104.03 |
| 2,631,315 | 3/1953 | Hauser | 15—104.04 |
| 2,710,418 | 6/1955 | Putnam | 15—104.07 |

FOREIGN PATENTS 118,096   3/1958   U.S.S.R.

MORRIS O. WOLK, *Primary Examiner.*

J. ZATARGA, *Assistant Examiner.*

UNITED STATES PATENT OFFICE
CERTIFICATE OF CORRECTION

Patent No. 3,285,778                            November 15, 1966

Ernest D. Hauk

It is hereby certified that error appears in the above numbered patent requiring correction and that the said Letters Patent should read as corrected below.

Column 10, line 16, for "exteriorly" read -- interiorly --.

Signed and sealed this 19th day of September 1967.

(SEAL)
Attest:

ERNEST W. SWIDER                                EDWARD J. BRENNER
Attesting Officer                                     Commissioner of Patents